United States Patent [19]
Konuma et al.

[11] Patent Number: 5,410,424
[45] Date of Patent: Apr. 25, 1995

[54] POLYMER DISPERSED LIQUID CRYSTAL WITH SURFACTANT FOR ALLEVIATING THE MUTUAL ATTRACTION BETWEEN THE LIQUID CRYSTAL AND THE POLYMER

[75] Inventors: Toshimitsu Konuma; Toshiji Hamatani, both of Kanagawa; Shunpei Yamazaki, Tokyo, all of Japan

[73] Assignee: Semiconductor Energy Laboratory Co., Ltd., Kanagawa, Japan

[21] Appl. No.: 264,247

[22] Filed: Jun. 22, 1994

Related U.S. Application Data

[63] Continuation of Ser. No. 947,461, Sep. 21, 1992, abandoned.

[30] Foreign Application Priority Data

Sep. 21, 1991 [JP] Japan ................... 3-270361

[51] Int. Cl.⁶ .................. G02F 1/13; G02F 1/1337
[52] U.S. Cl. ............................. 359/51; 359/52; 359/75; 359/99; 428/1
[58] Field of Search ................ 359/51, 52, 74, 75, 359/76, 77, 78, 99, 103; 428/1

[56] References Cited

U.S. PATENT DOCUMENTS

| | | | |
|---|---|---|---|
| 4,685,771 | 8/1987 | West et al. ............... | 359/51 |
| 4,950,052 | 8/1990 | Fergason et al. .......... | 359/52 |
| 5,056,898 | 10/1991 | Ma et al. ................ | 359/94 |
| 5,089,904 | 2/1992 | Fergason ................. | 359/51 |
| 5,198,912 | 3/1993 | Ingwall et al. ........... | 359/52 |
| 5,270,843 | 12/1993 | Wang .................... | 359/52 |

FOREIGN PATENT DOCUMENTS 0097921  4/1989  Japan.

*Primary Examiner*—William L. Sikes
*Assistant Examiner*—Kenneth Parker
*Attorney, Agent, or Firm*—Sixbey, Friedman, Leedom & Ferguson; Gerald J. Ferguson, Jr.; Evan R. Smith

[57] ABSTRACT

A liquid crystal electro-optical device which is a dispersion-type liquid crystal electro-optical device comprising an electro-optical modulating layer containing a liquid crystal material and a light-transmitting support, characterized by that there is established a force-relaxation portion for relaxing interfacial attractive force between said liquid crystal material and said light-transmitting support, and a process for fabricating the same. The force-relaxation portion can be an uncured transparent resinous material, a material obtained by decomposing the liquid crystal, a reformed surface portion, or a material selected from the group selected from lecithin, stearic acid, hexadecyltrimethylammonium bromide, octadecylmalonic acid, dibasic fatty acids, crown ethers, octadecylamine hydrochloride, and hexamethyldisilazane.

15 Claims, 4 Drawing Sheets

POLYMER DISPERSED LIQUID CRYSTAL WITH SURFACTANT FOR ALLEVIATING THE MUTUAL ATTRACTION BETWEEN THE LIQUID CRYSTAL AND THE POLYMER

This application is a continuation of Ser. No. 07/947,461, filed Sep. 21, 1992, now abandoned.

BACKGROUND OF THE INVENTION

1. Field of the Invention

The present invention relates to a dispersion-type liquid crystal electro-optical device based on a liquid crystal-resin composite comprising a polymer resin having dispersed therein a liquid crystal material, or on a liquid crystal-resin composite comprising a liquid crystal material having dispersed therein a resin. The present invention also relates to a method for forming the same.

2. Prior Art

Many liquid crystal electro-optical devices operating on a twisted nematic (TN) or a super-twisted nematic (STN) mode using nematic liquid crystal and the like are known and put into practice. Recently, there is also known a device using ferroelectric liquid crystals. All those liquid crystal electro-optical devices basically comprise a first and a second substrate each having provided thereon an electrode and a lead, and a liquid crystal composition being incorporated between those facing two substrates. Thus, by applying an electric field between the electrodes, the state of the liquid crystal molecules having incorporated between the substrates are changed according to the anisotropy in dielectric constant. Otherwise, in the case of ferroelectric liquid crystals, the state of the liquid crystal molecules are changed according to the spontaneous polarization of the liquid crystal molecule itself. The liquid crystal devices take advantage of this electro-optical effect for displaying images.

In a liquid crystal operating in a TN or an STN mode, the liquid crystal molecules which are brought into contact with the two substrates are subjected to an orientation treatment and are arranged along the rubbing direction. The rubbing directions in the upper and the lower substrates are twisted with respect to each other so that they may make right angle or an angle from 200° to 290°. Thus, it can be seen that the liquid crystal molecules at the midway between the two substrates are arranged in spirals to achieve a minimum energy. In the case of an STN type device, a chiral substance is added to the liquid crystal material if necessary.

The devices described hereinbefore, however, require essentially a polarizer sheet. Furthermore, the liquid crystals must be arranged along one direction within the liquid crystal electro-optical device. Such a regular orientation of liquid crystal molecules had been achieved by rubbing an orientation film (generally an organic film) with a cotton or a velvet cloth. If not for such an orientation treatment, the liquid crystal molecules would not arrange themselves along one direction and the electro-optical effect of the liquid crystals would not be fully exhibited. Thus, a conventional device generally takes a cell-like structure comprising a pair of substrates to support the liquid crystal material therebetween, so that the liquid crystal may be injected and then imparted orientation by applying a rubbing treatment thereto to exhibit the optical effect.

In addition to the liquid crystal electro-optical devices of the type above, there is also known a dispersion-type liquid crystal capable of providing a clear and high contrast image plane, yet free of such polarizer sheets and rubbing treatment mentioned above. A typical type of a prior art dispersion-type liquid crystal device comprises a light-transmitting solid polymer having dispersed therein granular or sponge-like liquid crystal materials to give a light-control layer. Another typical type of a prior art dispersion-type liquid crystal device comprises a liquid crystal material having dispersed therein a solid polymer with the liquid crystal molecules being oriented at random. This liquid crystal device can be fabricated by dispersing encapsulated liquid crystal materials into the polymer, and then coating a film or a substrate with the resulting polymer to give a thin film. Materials such as gum arabic, poly(vinyl alcohol), and gelatin can be used for encapsulating the liquid crystal materials.

Let us consider a case in which the microcapsules are prepared by encapsulating a liquid crystal material with poly(vinyl alcohol). If the liquid crystal molecules exhibit a positive dielectric anisotropy in the polymer thin film under an electric field, the molecules are arranged in such a manner that the major axes thereof are in parallel with the electric field. Thus, if the refractive index of the liquid crystal is the same as that of the polymer, the thin film turns transparent. When the applied electric field is removed, the liquid crystal molecules take a random orientation to hinder light path, and thus the film turns opaque. Various types of information can be displayed by taking advantage of the two states, i.e., a light-transmitting and an opaque state. Dispersion-type liquid crystals include, in addition to the encapsulated type above, those comprising liquid crystal materials being dispersed in an epoxy resin, those taking advantage of phase separation between liquid crystals and a resin by irradiating a light to a mixture of a liquid crystal and a photo-curable resin, and those comprising a three-dimensionally structured polymer having impregnated with a liquid crystal. The present invention refers to all those mentioned hereinbefore collectively as dispersion-type liquid crystals.

Because those dispersion type liquid crystal electro-optical devices can be fabricated free of polarizer sheets, an extremely high light transmittance can be achieved with the devices of this type as compared with the conventional ones operating in a TN or an STN mode and the like. More specifically, the transmittance per polarizer sheet is about 50%, and in a device driven by an active matrix using a plurality of polarizing sheets in combination, the transmittance falls to a mere 1%. The transmittance of an STN mode device also falls to about 20%, and hence efforts are made to obtain a brighter image plane by increasing luminarice of the backlighting. In contrast to these devices, a dispersion-type liquid crystal electro-optical device transmits 50% or more of the light. This owes to the fact that the device can be made completely free of polarizers.

As described in the foregoing, a dispersion-type liquid crystal functions by changing its state, i.e., a transparent state and an opaque state, and is advantageous in that it allows transmission of light at a larger amount. Thus, R & D efforts are paid mainly in realizing a transmitting-type liquid crystal electro-optical device; more particularly, in the realization of a projection type liquid crystal electro-optical device. In a projection type liquid crystal electro-optical device, the light is passed through a liquid crystal electro-optical device panel established midway in the light path of an incident light from the light source, and the light having passed through this panel is projected onto a wall via a slit having a predetermined angle. The liquid crystal molecules in the panel are in a random arrangement to give an opaque state when a low electric field below a certain threshold value is applied, i.e., when a low voltage to which the liquid crystal molecules do not respond is applied. The light is scattered upon incidence to the panel at this state, thus enlarging the light path. Then, the slit provided next to the panel cuts off most of the scattered light to give a black state to the wall. On the other hand, a light incident to liquid crystal molecules having arranged in parallel in correspondence to the applied electric field passes straight through the molecules without being scattered, thereby yielding a light state on the wall at a high brightness.

It can be seen from the foregoing description that, in a dispersion-type liquid crystal electro-optical device, the degree of the light scattering in accordance with the change in molecular orientation of the liquid crystal determines the contrast of a display. Accordingly, the liquid crystal material inside the device must be in a finely dispersed state. The fine liquid crystal droplets in general are in the range of from 0.3 to 3 μm, with maximum size being 10 μm and minimum being 0.05 μm. In case of too small liquid crystal droplets, the liquid crystal material greatly suffers disturbance exerted by the transparent resin material surrounding them. Then it becomes practically unfeasible to drive them with an external electric voltage conventionally applied in the art. Otherwise, the quantity of the liquid crystal material operable with a conventional driving power considerably decreases owing to such disturbance and again results in an insufficient realization of an electro-optical effect. In the latter case, a favorable contrast cannot be achieved.

Even in the states above, it is still possible to drive the liquid crystal materials by increasing the driving voltage. However, such a liquid crystal electro-optical device cannot be driven with a semiconductor integrated circuit (IC) because such a high driving voltage cannot be realized with an IC. In view of the fact that the maximum allowable driving voltage at present is about 30 V, there may be considered increasing the thickness of the liquid crystal layer as an alternative measure to achieve a high contrast. But again, the result is a further drop in contrast, because the output voltage from the semiconductor device cannot be increased and hence the applied intensity of the electric field becomes too low to drive a liquid crystal.

SUMMARY OF THE INVENTION

Accordingly, as a solution to the aforementioned problems, the present invention provides a dispersion-type liquid crystal electro-optical device comprising an electro-optical modulating layer and a portion (referred to hereinafter simply as "force-relaxation portion") which relaxes or alleviates or eliminates the interfacial force (mutual attraction) which generates at the contact portion between the liquid crystal material and the transparent resin material. Then, the interacting attractive force between the liquid crystal and the resin can be reduced while providing a higher degree of freedom in the driving of the liquid crystal material. The electro-optical device according to the present invention comprises an electro-optical modulating layer which comprises the force-relaxation portion, the liquid crystal material and the transparent resin material.

The force-relaxation portion above lowers the electric voltage necessary for driving the liquid crystal to about a half of that required for a liquid crystal having no such portions, thus making the liquid crystal sufficiently drivable under conditions which have been generally employed in the art and obtainable of favorable electro-optical effects.

Thickness of the force-relaxation portion is 10 to 1000 Å. That is, several molecule layers to several tens molecule layers are provided as the force-relaxation portion in a thickness direction of the force-relaxation portion.

DETAILED DESCRIPTION OF THE INVENTION

Figure 1:
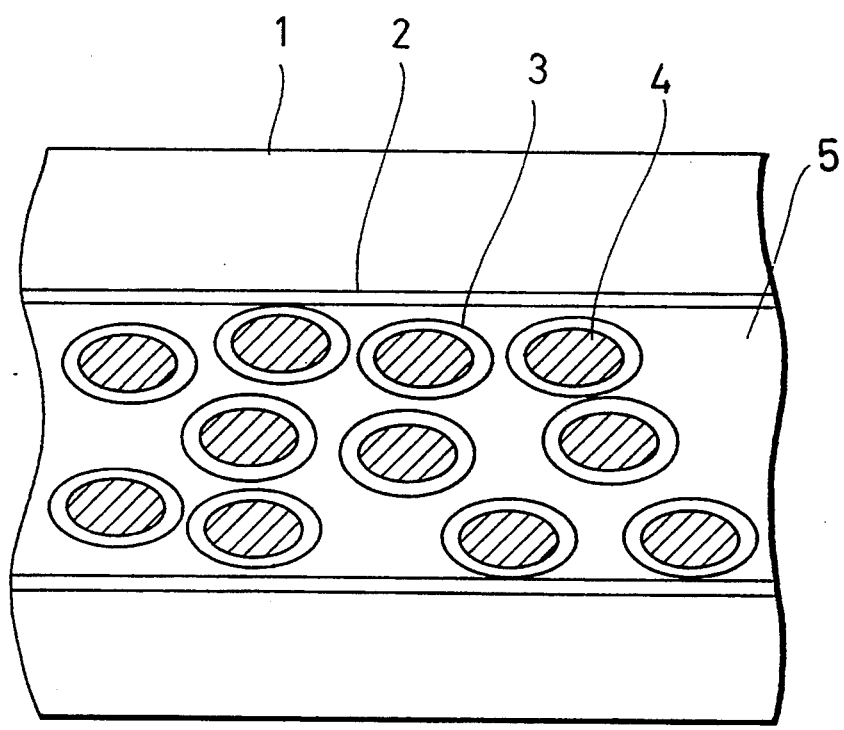
FIG. 1 shows a schematically drawn cross section of a liquid crystal electro-optical device according to the present invention.

The present invention provides a dispersion-type liquid crystal electro-optical device having provided a force-relaxation portion between the liquid crystal material and the solid transparent resin. This force-relaxation portion can be established between the liquid crystal material and the transparent resin by many novel processes (methods).

For example, there can be proposed as one of such novel processes, a process based on a phase separation process known in the art for fabricating dispersion-type liquid crystal electro-optical devices, wherein, the conventionally employed agent for imparting liquid crystal orientation (the conventionally employed material for orienting a liquid crystal) is directly mixed with the liquid crystal material and the transparent resin monomers, and then the resin polymer and the liquid crystal material are separated by photopolymerization. Accordingly, this agent (material) can be condensed between the liquid crystal material and the transparent resin to thereby make it function as a force-relaxation agent.

The process comprises the steps of:
providing a mixture comprising a liquid crystal, a transparent material and a material for orienting a liquid crystal on a substrate; and
hardening said transparent material to form between said liquid crystal and the hardened transparent material a region alleviating a mutual attraction between said liquid crystal and said hardened transparent material.

The agent for imparting orientation to the liquid crystal molecules which is useful in the present process can be appropriately selected from among the agents for imparting vertical orientation and horizontal orientation, by considering which liquid crystal material to use actually, and also taking into consideration the properties and kind of the transparent resin to be employed with the liquid crystal material. In some instances, the vertical- and horizontal-orientation imparting agents may be used as a mixture thereof to tailor the force-relaxation function as desired.

Examples of the useful orientation-imparting agents include lecithin, stearic acid, hexadecyltrimethylammonium bromide (CTAB), octadecylmalonic acid, dibasic fatty acids [e.g., $HOOC(CH_2)_nCOOH$, where $n=3$ to 11], crown ethers, octadecylamine hydrochloride, and organic silanes (e.g., hexamethyldisilazane). Among them, those agents conventionally used for vertical orientation were found more favorable to relax the regulatory force between the liquid crystal material and the transparent resin. The reason for this is not sufficiently clarified, but considering that such agents allow the liquid crystal molecules arrange vertical to the transparent resin, it is readily understood that such agents reduce the contact area between the liquid crystal and the transparent resin, thereby more effectively relaxing the force exerted between them.

A second process of the novel proposed ones comprises irradiating an ultraviolet (UV) light to the liquid crystal materials having provided in a dispersed state by any of the processes such as phase separation, impregnation, and casting, thereby decomposing the surface portion of the minute liquid crystal droplets having dispersed in the resin. This decomposed portion covering the outer surface of the liquid crystal functions as the force-relaxation portion.

The second process may comprise the steps of:
providing a mixture comprising a liquid crystal and a transparent material on a substrate;
completely hardening said transparent material; and
decomposing a portion of said liquid crystal by light irradiation to form between said transparent material and said liquid crystal a region alleviating a mutual attraction between said transparent material and said liquid crystal.

This process takes advantage of the fact that an organic matter (liquid crystal material) readily decomposes into organic substances of lower molecular weight upon irradiation of an intense UV light. Those low molecular weight substances gather between the transparent resin and the liquid crystal material to function as a force-relaxation portion.

However, there sometimes occurs that the organic matter thus decomposed do not gather at the boundary between the liquid crystal material and the transparent resin but scatter in the liquid crystal material. In such a case, the liquid crystal electro-optical device is once heated to allow the liquid crystal material undergo phase transition into an isotropic phase, and then it is gradually cooled. (The electro-optical device is maintained over a temperature at which the liquid crystal exhibits an isotropic phase and subsequently cooled to enhance formation of the force-relaxation portion.) By such a treatment, the organic matter having decomposed aggregates at the boundary between the liquid crystal material and the transparent resin during the phase transition by the separating (precipitation) of the liquid crystal material to function as a force-relaxation portion.

A third process among the novel processes comprises basically a phase separation process for the fabrication of a dispersion-type liquid crystal electro-optical device, however, the curing of the transparent resin is conducted under a condition which achieves only 80 to 98%, more preferably from about 90 to 98% of the complete curing. Such a process provides an uncured transparent resin monomer layer around the dispersed liquid crystal materials, which is not hardened and functions as a force-relaxation portion. A cured transparent solid material is also formed by such a process. The process comprises the steps of:
providing a mixture comprising a liquid crystal and a transparent material on a substrate; and
hardening a portion of said transparent material under an incomplete hardening condition which does not satisfy a complete hardening condition of said transparent material to form between said liquid crystal and the hardened portion of said transparent material a region alleviating a mutual attraction between said liquid crystal and said hardened portion.

The curing condition which achieves only 80 to 98%, more preferably from about 90 to 98% of the complete curing of the resin signifies that the curing is carried out at a condition corresponding to 80 to 98% of the product of the temperature and the duration required for a complete curing. More specifically, for example, if the resin under consideration is such which can be completely cured by a thermal energy at 250° C. for a duration of 60 minutes, the curing condition is then expressed by the product of those temperature and duration, i.e., 15,000 (° C. minute); the condition corresponding to from 80 to 98% then signifies that the curing is performed for 12,000 to 14,700 (° C. minute). The conditions considered herein may in some occasions include the irradiation conditions of a light energy, e.g. an ultraviolet ray energy, in the place of the temperature condition, or may include the combination of the thermal energy and the light energy.

Heat and/or ultraviolet ray irradiation may be weakened, that is, the temperature may be lowered and/or the ultraviolet ray may be weakened, to decelerate the hardening (curing). The deceleration can enhance aggregation of the uncured resin monomers between the liquid crystal material and the cured transparent solid material.

A fourth process of the newly proposed ones include, in a dispersion-type liquid crystal electro-optical device comprising the transparent resin being dispersed in the liquid crystal and being scattered in the electro-optical modulating layer instead of the liquid crystal being dispersed in a transparent resin, modifying (reforming) the surface of the thus dispersed minute transparent resin droplets. The surface-modified (surface-reformed) portion functions as the force-relaxation portion. The surface of the minute resin droplets may be modified by coating the surface of the resin droplets with an orientation film or an orientation-imparting agent commonly used in a conventional liquid crystal electro-optical device, by plasma-treating the surface, etc. Particularly effective among them is to coat the resin surface with an orientation-imparting material having a low polarity, because a favorable force-relaxation can be achieved, and, because in the practical driving of the resulting liquid crystal electro-optical device, an excellent voltage retention can be obtained.

As another process similar to the foregoing one comprising surface-modifying a resin to relax the force between the liquid crystal and the transparent resin, there can be mentioned a process for a dispersion-type liquid crystal electro-optical device based on an impregnation process. That is, after a transparent resin is formed into a three-dimensional network-structured structure, it is further surface-modified by coating it with an orientation film or an orientation-imparting agent commonly used in a conventional liquid crystal electro-optical device, by plasma-treating the surface, etc. In this case, the openings of the network are preferably provided a slightly larger than in the conventional case to modify the three-dimensional network resin over the whole liquid crystal electro-optical device.

Referring to the schematically drawn cross section view in FIG. 1, an embodiment according to the present invention is described as a representative example. It should be noted, however, that FIG. 1 is provided only for explanatory use, and that the shape and the dimension of the constituents in the Figure are not precise. A liquid crystal material 4 is dispersed in a transparent resin 5, which are both supported between glass substrates 1. To the glass substrate 1 is established a clear electrode 2 made such as of indium-tin-oxide (ITO).

As a portion having a function of relaxing the force between the dispersed liquid crystals 4 and the transparent resin 5, a force-relaxation portion 3 is provided around every liquid crystal droplet 4 having dispersed in the resin. Though FIG. 1 provides only a cross sectional view, it should be noted that the force-relaxation portion 3 is provided all over the liquid crystal material 4 to completely cover the material.

In any event, by providing in accordance with the present invention a portion capable of relaxing the interfacial attractive force between the transparent resin and the liquid crystal material having dispersed therein or that between the liquid crystal material and the transparent resin having dispersed therein, the liquid crystal material of a dispersion-type liquid crystal electro-optical device can be driven with more size-reduced liquid crystal droplets and hence realize a display with a higher contrast while applying a driving electric potential well comparable to the conventional ones.

Furthermore, the liquid crystal electro-optical device comprising a substrate having established thereon only a clear electrode 2 as shown schematically in FIG. 1, can be modified in various ways. For example, a non-linear device of a metal-insulator-metal (M-I-M) type comprising layers of metal having incorporated therebetween an insulator layer can be established on one of the substrates simultaneously with the formation of the clear electrode. Otherwise, a thin film transistor (TFT) may be provided instead of the M-I-M device.

In general, a dispersion-type liquid crystal does not have a steep rise in transmission intensity upon application of an electric field. Accordingly, a direct matrix drive of a dispersion-type liquid crystal using a plurality of electrodes is unlikely. It is preferred to establish auxiliary non-linear devices or TFTs to compensate for the slow rise in transmission intensity of the liquid crystal upon application of an electric field. In this manner, each of the pixels can be matrix-driven and independently switched from a dispersed state to a light-transmitting state and vice versa.

Nematic, smectic, cholesteric, and other known liquid crystal materials can be favorably used in the liquid crystal electro-optical device according to the present invention. However, the material suited for use in the force-relaxation portion may vary according to the characteristics of the thus selected liquid crystal material.

Furthermore, in the description hereinbefore, the support for the liquid crystal material has been referred to as a transparent resin. However, this resin need not be transparent to all the light covering the whole range in wavelength. It is required that it has at least 50% of light transmittance to the light having a wavelength in the range used in the liquid crystal electro-optical device; moreover, this support is not necessarily a resin, and also applicable are inorganic materials or organic materials other than resins, or naturally occurring materials and the like, so long as the material chosen is capable of supporting the liquid crystal material.

It is also to be noted here that in the present description and in FIG. 1, the liquid crystal material being dispersed in the resin is expressed as droplets or shown simply as spheres in the figures. However, such descriptions and expressions are only for the sake of simplicity, and in reality, the liquid crystal material may take other shapes and forms.

The present invention is described in further detail below referring to some examples. However, it should be understood that the present invention is not to be construed as being limited to those examples.

EXAMPLE 1

Figure 3:
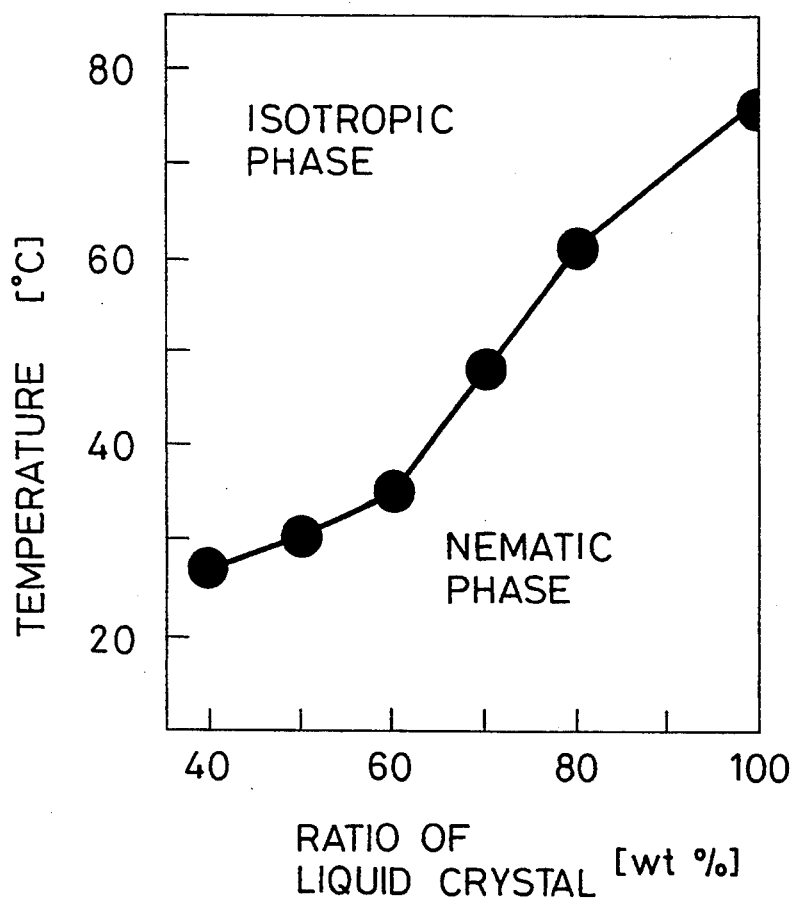
FIG. 3 is a graph showing the phase transition temperature of a liquid crystal material system usable in the liquid crystal electro-optical device according to the present invention.

An indium-tin-oxide (ITO) film 2, i.e., a light-transmitting electrically conductive film, was deposited on a first substrate 1 as shown in FIG. 1, at a thickness of from 500 to 2,000 Å by a known vapor deposition or sputtering process. The sheet resistivity of the resulting film was in the range of from 20 to 200 $\Omega/cm^2$. A finished first substrate 1 was obtained by patterning the deposited film on the substrate by a conventional photolithographic process. A second substrate having established thereon a clear electrode was fabricated in the same manner as in the case of the first substrate. The first and the second substrates thus obtained were then laminated together incorporating therebetween a spacer, to thereby maintain a spacing between the substrates of from 5 to 50 $\mu$m, preferably, from 7 to 20 $\mu$m. Then, a mixture comprising a cyanobiphenyl nematic liquid crystal having a refractive index of 1.582 and a $\Delta n$ of 0.240 and a photocurable resin having a refractive index of 1.573 (a mixed system of a urethane-based oligomer and an acrylic monomer), having added further therein an organic silane, i.e., hexamethyldisilazane as an agent for imparting orientation to the liquid crystal material, was injected between the two substrates. In the present example, the liquid crystal and the monomer were mixed at a ratio by weight of 65/35. Accordingly, the temperature of phase transition from nematic to isotropic phase (N-I transition point) was about 40° C. The N-I transition points for the liquid crystal-resin mixtures varying in mixing ratio are plotted in FIG. 3. In the present example, the orientation-imparting agent was added together into the liquid crystal mixture at an amount of 1% by weight.

The liquid crystal mixture thus prepared was injected between the first and the second substrates of the liquid crystal cell having fabricated above, at a temperature higher than the N-I phase transition point of the liquid crystal mixed system. Then, to the liquid crystal mixed system inside the liquid crystal cell was irradiated a UV light at an irradiation intensity of from about 10 to about 100 mW/cm$^2$ for a duration of from about 30 to about 300 seconds, to thereby cure the resin while allowing the system undergo phase separation. During the phase separation between the liquid crystal material and the resin, the liquid crystal orientation-imparting material 3 was observed to concentrate between the liquid crystal material and the resin to surround the liquid crystal 4.

Thus was obtained a dispersion-type liquid crystal electro-optical device comprising dispersed liquid crystal 4 being covered with a force-relaxation portion 3. The average size of the thus dispersed liquid crystal 4 was observed to be about 1.5 μm. Furthermore, the dispersed liquid crystal was observed to homogeneously distribute over the whole liquid crystal electro-optical device.

In increasing the addition of the orientation-imparting material, the force-relaxation power was observed to decrease. Accordingly, the addition of the orientation-imparting is preferably in the range of from 0.3 to 2% by weight, and more preferably, in the range of from 0.5 to 1.5% by weight.

The resulting liquid crystal electro-optical device yielded a sufficiently high contrast upon application of a liquid crystal driving voltage in the range of from 15 to 25 V.

Figure 4:
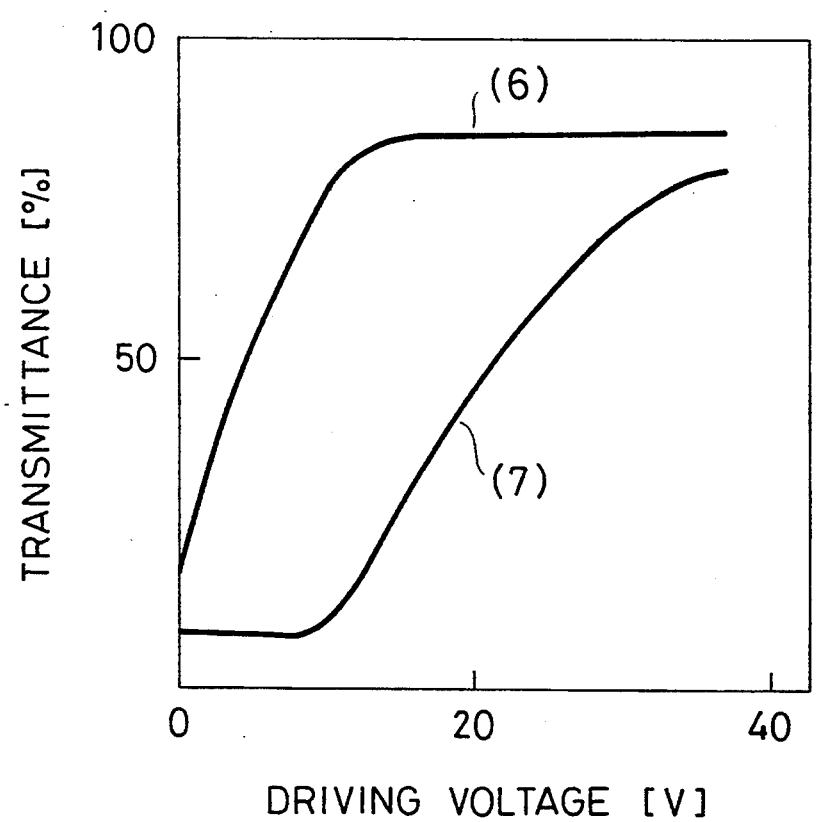
FIG. 4 is a graph which relates the driving voltage to transmission (transmittance) of a liquid crystal electro-optical device according to the present invention.

In FIG. 4 is shown for comparative means, a relation between the light transmittance of a liquid crystal electro-optical device having fabricated without adding any orientation-imparting agent and the driving voltage. The curve marked with numeral 6 in FIG. 4 is for a liquid crystal electro-optical device comprising a force-relaxation portion, having fabricated by adding hexamethyldisilazane as the orientation-imparting material, whereas the curve marked with 7 is for a liquid crystal electro-optical device having fabricated free of such force-relaxation portion.

Because FIG. 4 is drawn by taking the transmittance of a liquid crystal electro-optical device as the ordinate and the driving voltage as the abscissa, and considering that the liquid crystal electro-optical devices were fabricated with approximately the same thickness, the voltage necessary for driving a device can be directly read from the abscissa.

It can be seen clearly from FIG. 4 that the liquid crystal electro-optical device having the force-relaxation portion according to the present invention realizes a higher transmission with a lower driving voltage. Furthermore, considering that the liquid crystal electro-optical device according to the present invention has a slightly higher transmittance at the state of zero applied voltage, it can be anticipated that more liquid crystal molecules are randomly arranged in the liquid crystal material according to the present invention, because the force exerted from the resin to the liquid crystal molecules are much more relaxed.

By further comparing the curve 6 with curve 7, it can be seen that the liquid crystal according to the present invention rapidly increase the transmittance upon application of a voltage. On the other hand, the curve 7 shows that the rise in transmittance with increasing applied voltage is rather sluggish until the voltage reaches a certain value. It is also confirmed by this fact that the regulatory force exerted from the resin to the liquid crystal is decreased by the relaxation portion having provided in the liquid crystal material according to the present invention.

EXAMPLE 2

A liquid crystal electro-optical device was fabricated by homogeneously dispersing a liquid crystal material, following a similar process as that used in Example 1. The liquid crystal material and the resin monomer were also the same as those used in Example 1, except that no orientation-imparting agent was mixed, and that a bichromatic dye was added to the liquid crystal material to realize a liquid crystal electro-optical device of a guest-host mode.

A UV light in the wavelength range of from 310 to 400 nm was irradiated uniformly to the liquid crystal electro-optical device at an irradiation density of 10 mW/cm$^2$ from the upper side of the substrate, to thereby decompose a part of the dispersed liquid crystal material. As a preliminary test to know the degree of decomposition, the change in the resistivity of the liquid crystal material was measured at various durations of irradiation, and the point at which the resistivity yielded a value deteriorated by about 5 to 15% of the initial value was set as the duration for the UV irradiation.

In the case of the biphenyl liquid crystal material used in the present example, a 5% deteriorated resistivity was obtained after passage of 20 minutes from the initiation of light irradiation. A 15% deteriorated resistivity was obtained after a lapse of 60 minutes. Accordingly, the duration of UV irradiation was set to 40 minutes.

By this UV irradiation treatment, a part of the liquid crystal material was decomposed, and the product from the decomposition was remained between the liquid crystal material and the transparent resin to function as a force-relaxation portion for the liquid crystal.

The liquid crystal electro-optical device obtained as a result could be operated with a driving voltage about 30% lower than that necessary for a device not subjected to irradiation with a UV light. However, when the light irradiation was continued longer for 100 minutes, the driving voltage became saturated and did not drop any more. Reversely, the display began to lose its high contrast. This is due to the excess degree of decomposition in the liquid crystal material; the amount of the liquid crystal which provides the electro-optical effect becomes too small.

Despite a UV light was used for the radiation in the present example, the light for use in the irradiation is not particularly limited to a UV light, and any other light having sufficient energy for cutting a molecular bond is effective. It is more preferable to irradiate a light at a specific wavelength at which the desired bond most efficiently absorbs the light, because the other bonds remain unaffected while the decomposition of the particular bond is accelerated to establish the force-relaxation portion in the liquid crystal electro-optical device.

It is further preferred to once heat the liquid crystal electro-optical device to a temperature range for the isotropic phase after irradiating with light, and gradually cooling the device thereafter to allow the liquid crystal precipitate. Such a treatment is effective for more efficiently concentrating the decomposed organic matter between the liquid crystal material and the transparent resin. The liquid crystal material in the present example additionally comprises a dye. Thus, the present process is characterized by that a light having a pertinent energy is irradiated to the liquid crystal material to control the decomposition process; this is advantageous in that a large part of the liquid crystal material can be maintained without being decomposed by irradiation of a UV light of high intensity. The dye may be mixed with a mixture comprising the liquid crystal and the transparent material before the hardening step (the curing step of the transparent material (resin)).

EXAMPLE 3

An indium-tin-oxide (ITO) film 2, i.e., a light-transmitting electrically conductive film, was deposited on a first substrate 1 as shown in FIG. 1, at a thickness of from 500 to 2,000 Å by a known vapor deposition or sputtering process. The sheet resistivity of the resulting film was in the range of from 20 to 200 Ω/cm$^2$. A finished first substrate 1 was obtained by patterning the deposited film on the substrate by a conventional photolithographic process. A second substrate having established thereon a clear electrode was fabricated in the same manner as in the case of the first substrate. The first and the second substrates thus obtained were then laminated together incorporating therebetween a spacer, to thereby maintain a spacing between the substrates of from 5 to 50 μm, preferably, from 7 to 20 μm. Then, a mixture comprising a smectic liquid crystal which is ferroelectric and a photocurable resin having a refractive index of 1.573 (a mixed system of a urethane oligomer and an acrylic monomer) was injected between the two substrates. In the present example, the liquid crystal and the monomer were mixed at a ratio by weight of 70/30. Accordingly, the temperature of phase transition from smectic to isotropic phase (Sm-I transition point) was about 70° C.

The liquid crystal mixture thus prepared was injected between the first and the second substrates of the liquid crystal cell having fabricated above, at a temperature higher than the Sm-I phase transition point of the liquid crystal mixed system. Then, to the liquid crystal mixed system inside the liquid crystal cell was irradiated a UV light at an irradiation intensity of from about 10 to about 100 mW/cm$^2$ for a duration of from about 30 to about 300 seconds, to thereby cure the resin while allowing the system undergo phase separation. Since the conditions for complete curing of the resin was 3,000 mW.sec/cm$^2$, the curing in this example was conducted under a condition of 2,800 mW.sec/cm$^2$ in two steps; the first step was carried out as a pre-curing step by applying an energy corresponding to 2,500 mW.sec/cm$^2$, and the second step was conducted by irradiating the light at an intensity reduced to 1/10 of that in the first step, thus satisfying the condition of 2,800 mW.sec/cm$^2$ in total of two steps.

Thus was obtained a liquid crystal electro-optical device based on a liquid crystal-resin composite system comprising a force-relaxation portion by concentrating the un-cured monomers and oligomers of the resin between the liquid crystal material and the transparent resin.

EXAMPLE 4

Figure 2:
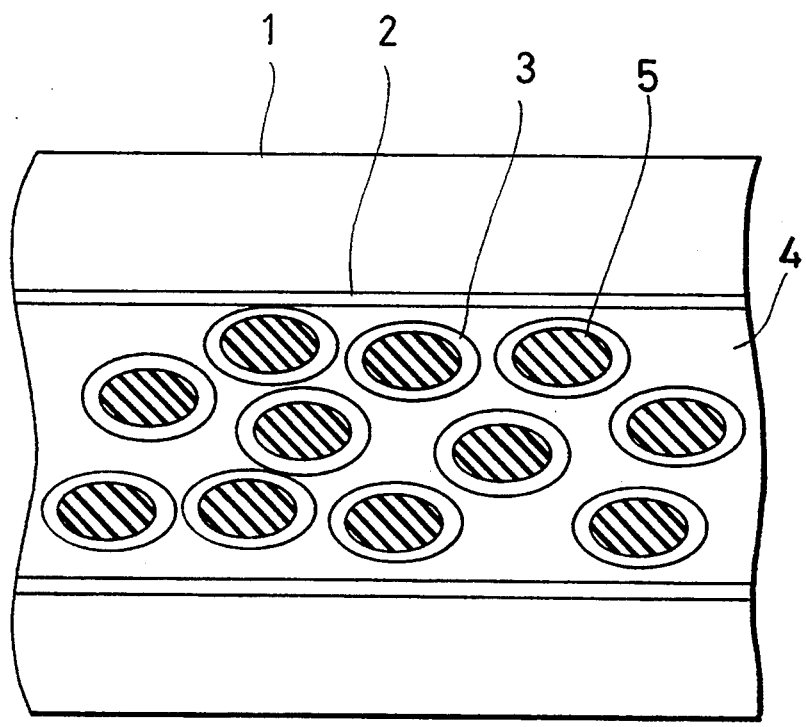
FIG. 2 shows a schematically drawn cross section of another liquid crystal electro-optical device according to the present invention.

In FIG. 2 is given the cross-sectional structure of the liquid crystal electro-optical device of the present example. As can be read from FIG. 2, this structure differs from those of the previous Examples in that a liquid crystal material 4 is provided between the substrates 1, and that the transparent resin 5 is dispersed in the liquid crystal material 4. The dispersed transparent resin 5 is arranged as such that it may not give a one-direction orientation to the liquid crystal material 4. Accordingly, the transparent resin is provided as droplets of a proper size, and these droplets are properly located as such that they may not give a uniform wall face against the liquid crystal. This type of liquid crystal electro-optical device also realizes an electro-optical effect by taking advantage of light scattering, and is hence a dispersion-type liquid crystal electro-optical device.

In the present example, a force-relaxation portion 3 was provided on the surface of the transparent resin 5 to enable drive under a lower driving potential. This is illustrated in FIG. 2. The force-relaxation portion 3 in this example was provided by coating the surface of the transparent resin 5 with a liquid crystal orientation-imparting material, followed by removing the solvent from the coating. The orientation-imparting material may be selected from various materials, but hexadecyltrimethylammonium bromide (CTAB) was used in the present example.

First, as shown in FIG. 2, an indium-tin-oxide (ITO) film 2, i.e., a light-transmitting electrically conductive film, was deposited on a first substrate 1 at a thickness of from 500 to 2,000 Å by a known vapor deposition or sputtering process. The sheet resistivity of the resulting film was in the range of from 20 to 200 Ω/cm$^2$. A finished first substrate 1 was obtained by patterning the deposited film on the substrate by a conventional photolithographic process. A second substrate having established thereon a clear electrode was established in the same manner as in the case of the first substrate. The first and the second substrates thus obtained were then laminated together incorporating therebetween a spacer, to thereby maintain a spacing between the substrates of from 5 to 50 μm, preferably, from 7 to 20 μm.

Then, a mixture comprising a smectic liquid crystal which is ferroelectric and a transparent resin composed of spherical acrylic resin about 5 μm in average diameter having provided on the surface thereof a CTAB coating as the force-relaxation portion 3 was injected between the two substrates. In the present example, the liquid crystal and the transparent resin were mixed at a ratio by weight of 70/30. Accordingly, the temperature of phase transition from smectic to isotropic phase (Sm-I transition point) was about 70° C.

The liquid crystal mixture thus prepared was injected between the first and the second substrates of the liquid crystal cell having fabricated above, at a temperature higher than the Sm-I phase transition point of the liquid crystal mixed system.

The resulting liquid crystal electro-optical device thus obtained was capable of driving under a low driving voltage similarly to the devices obtained in the foregoing Examples 1 to 3. That is, the liquid crystal electro-optical device thus obtained could be driven with a semiconductor IC generally used for driving the conventional liquid crystal devices.

Despite the force-relaxation portion was provided in the present invention by coating the surface of the resin with a liquid crystal orientation-imparting material, another means of surface modification can be employed for establishing such portions. For example, surface modification processes include plasma-treating the transparent resin in a gas, e.g., oxygen, hydrogen, nitrogen, a hydrocarbon, a carbon halide, hydrogen fluoride, and argon, or in a mixture of gases selected therefrom. A plasma treatment establishes a force-relaxation portion on the surface of the transparent resin by, for example, coating the surface of the transparent resin with a newly formed film, and by modifying the type and kind of the functional groups present on the surface.

It is also possible to fabricate liquid crystal electro-optical devices by establishing first a three-dimensionally structured transparent resin between the substrates, and then plasma treating the resulting resin structure, or by further applying a liquid crystal orientation-imparting material to the resulting resin structure and then impregnating it with a liquid crystal material.

As described in detail in the foregoing Examples, the dispersion-type liquid crystal electro-optical device according to the present invention comprises established therein a portion for relaxing the interfacial attractive force between the dispersed liquid crystal materials and the transparent resin, or between the dispersed transparent resin and the liquid crystal material. The resulting dispersion-type liquid crystal electro-optical device can be driven with more finely divided liquid crystal droplets and hence enables displays with a ever higher contrast without increasing the driving voltage.

As described hereinbefore, the present invention provides a dispersion-type liquid crystal electro-optical device which can be driven with a low driving voltage. Accordingly, it was possible to provide the liquid crystal material in dispersed droplets controlled to a size most ideal for realizing a high contrast display. Furthermore advantageously, the elimination of polarizer sheets realized a liquid crystal display having low loss of light and a extremely high contrast.

The present invention provides, as another advantageous point, a process for fabricating a liquid crystal electro-optical device having readily established therein a uniform force-relaxation portion between the liquid crystal material and the transparent resin, said process comprising making use of the phase separation, contact angles, etc., inherent in the materials.

While the invention has been described in detail and with reference to specific embodiments thereof, it will be apparent to one skilled in the art that various changes and modifications can be made therein without departing from the spirit and scope thereof.

What is claimed is:

1. An electro-optical device comprising:
    an electro-optical modulating layer comprising a liquid crystal and a transparent solid material therein; and
    a region alleviating a mutual attraction between said liquid crystal and said transparent solid material and provided between said liquid crystal and said transparent solid material, said region comprising an uncured transparent resinous material,
    wherein said modulating layer is in a light transparent state in the presence of an electric field applied thereto and in a light scattering state in the absence of an electric field.

2. The device of claim 1 wherein said liquid crystal is dispersed in said transparent solid material.

3. The device of claim 1 wherein said transparent solid material is dispersed in said electro-optical modulating layer.

4. The device of claim 1 wherein said region comprises a material for orienting a liquid crystal.

5. The device of claim 1 wherein said liquid crystal comprises a liquid crystal selected from the group consisting of nematic liquid crystal, smectic liquid crystal and cholesteric liquid crystal.

6. The device of claim 1 wherein thickness of said region is 10 to 1000 Å.

7. An electro-optical device comprising:
    an electro-optical modulating layer comprising a liquid crystal and a transparent solid material therein; and
    a region alleviating a mutual attraction between said liquid crystal and said transparent solid material and provided between said liquid crystal and said transparent solid material,
    wherein said region comprises an organic substance obtained by decomposing said liquid crystal.

8. An electro-optical device comprising:
    an electro-optical modulating layer comprising a liquid crystal and a transparent solid material dispersed in said electro-optical modulating layer; and
    a region alleviating a mutual attraction between said liquid crystal and said transparent solid material and provided between said liquid crystal and said transparent solid material,
    wherein said region comprises a reformed surface portion of said transparent solid material.

9. An electro-optical device comprising:
    an electro-optical modulating layer comprising a liquid crystal and a transparent solid material therein; and
    a region provided between said liquid crystal and said transparent solid material and comprising a material selected from the group consisting of a transparent uncured resinous material, and an organic substance obtained by decomposing said liquid crystal.

10. An electro-optical device comprising:
    an electro-optical modulating layer comprising a liquid crystal and a transparent solid material, said liquid crystal dispersed in said transparent solid material.
    wherein a material selected from the group consisting of lecithin, stearic acid, hexadecyltrimethylammonium bromide (CTAB), octadecylmalonic acid, dibasic fatty acids, crown ethers, octadecylamine hydrochloride, and an organic silane comprising hexamethyldisilazane is separated at boundaries between said liquid crystal and said transparent solid material.

11. The device of claim 7 wherein said liquid crystal is dispersed in said transparent solid material.

12. The device of claim 7 wherein said transparent solid material is dispersed in said electro-optical modulating layer.

13. The device of claim 8 wherein the transparent solid material is dispersed in the liquid crystal material.

14. The device of claim 10 wherein the liquid crystal material surrounds the solid material.

15. An electro-optical device comprising:
    an electro-optical modulating layer comprising a liquid crystal and a transparent solid material, said liquid crystal dispersed in said transparent solid material,
    wherein a material selected from the group consisting of lecithin, hexadecyltrimethylammonium bromide (CTAB), octadecylmalonic acid, dibasic fatty acids, crown ethers, octadecylamine hydrochloride, and an organic silane comprising hexamethyldisilazane is separated at boundaries between said liquid crystal and said transparent solid material.

* * * * *